June 10, 1924.　　　　　　　　　　　　　　1,497,242
G. H. MARTIN
LAWN MOWER RAKE ATTACHMENT
Filed Oct. 31, 1921
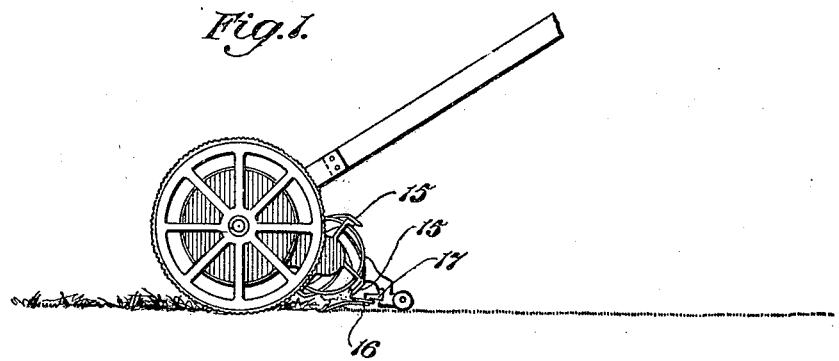
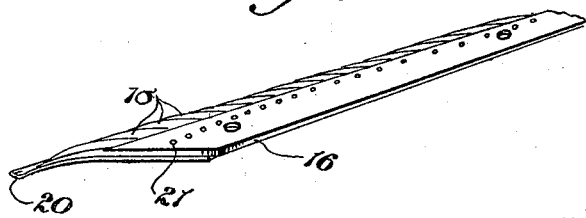
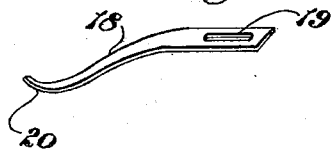
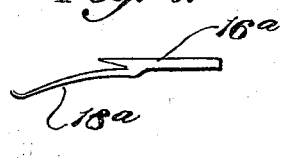
Inventor:
George H. Martin.
by Hazard & Miller
Attys.

Patented June 10, 1924.

1,497,242

UNITED STATES PATENT OFFICE.

GEORGE H. MARTIN, OF LOS ANGELES, CALIFORNIA.

LAWN-MOWER RAKE ATTACHMENT.

Application filed October 31, 1921. Serial No. 511,586.

*To all whom it may concern:*

Be it known that I, GEORGE H. MARTIN, a citizen of the United States, residing at Los Angeles, in the county of Los Angeles and State of California, have invented new and useful Improvements in Lawn-Mower Rake Attachments, of which the following is a specification.

My invention relates to lawn mowers, and a purpose of my invention is the provision of an attachment therefor by means of which Bermuda grass, or grass of similar nature, is automatically moved to an upstanding position so as to be engaged by the cutting mechanism of the lawn mower.

I will describe two forms of lawn mower attachments therefor embodying my invention and will then point out the novel features thereof in claim.

In the accompanying drawings,

Figure 1 is a view showing in end elevation a conventional form of lawn mower having applied thereto one form of attachment embodying my invention.

Fig. 2 is an enlarged fragmentary perspective view of the ledger blade of the lawn mower shown in Fig. 1 with the attachments in applied position thereon.

Fig. 3 is a detail perspective view of one of the attachments.

Fig. 4 is a modified form of ledger blade and attachment also embodying my invention.

Similar reference characters refer to similar parts in each of the several views.

Referring specifically to the drawings and particularly to Figs. 1 and 2, I have here shown a conventional form of lawn mower including the rotary cutting blades 15 and the ledger blade 16, the latter being as usual supported upon a bracket 17. The attachment forming the subject matter of my invention comprises, in the present instance, a plurality of fingers 18, each of which, as shown to advantage in Fig. 3, is formed of a single strip of metal having a relatively wide end formed with a slot 19, and curved longitudinally so as to form a depending arcuate shaped extremity 20. In the applied position of each finger 18, it is secured to the under side of the ledger blade 16 by a bolt 21 which extends through the blade and through the slot 19, the latter being of elongated form to permit of the necessary adjustment of the finger upon the blade.

As shown in Fig. 2 the several fingers are arranged upon the blade with their side edges contacting with each other, and with their depending extremities 20 projecting forwardly of the cutting edge of the blade. As shown in Fig. 1, the extremities 20 are adapted to move over the surface of the ground during the operation of the lawn mower, with the extremities 20 passing beneath those blades of grass which closely adhere to the ground. Because of the curvature of the finger, the blades of grass are automatically lifted and held in upstanding position until engaged by the ledger blade 16, when the rotary blades co-act with the ledger blade in effecting a cutting of the grass.

Referring now to Fig. 4, I have here shown my attachment as formed integral with the ledger blade, the latter, in the present instance, being designated at $16^a$ and the finger at $18^a$. It is to be understood that substantially the same number of fingers $18^a$ are used in conjunction with the blades $16^a$ as in the form of my invention shown in Fig. 2, although the continuous cutting edge formed by said blades is suitably spaced from the respective fingers $18^a$.

Although I have herein shown and described only two forms of lawn mower attachments embodying my invention, it is to be understood that various changes and modifications may be made herein without departing from the spirit of the invention and the spirit and scope of the appended claim.

What I claim is:

In a lawn mower, a ledger blade and fingers formed integral therewith, said blade having a beveled cutting edge projecting forwardly beyond and overhanging the line of connection between said fingers and said blade, said fingers having a forwardly and downwardly extending portion adjacent the cutting edge of the blade and having an upwardly and forwardly extending end portion.

In testimony whereof I have signed my name to this specification.

GEO. H. MARTIN.